(12) United States Patent
Nakano

(10) Patent No.: US 9,241,107 B2
(45) Date of Patent: Jan. 19, 2016

(54) IMAGE PICKUP DEVICE AND FOCAL PLANE SHUTTER

(71) Applicant: SEIKO PRECISION INC., Narashino-shi (JP)

(72) Inventor: Yoichi Nakano, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/199,163

(22) Filed: Mar. 6, 2014

(65) Prior Publication Data

US 2014/0267853 A1  Sep. 18, 2014

(30) Foreign Application Priority Data

Mar. 18, 2013  (JP) ................. 2013-055576

(51) Int. Cl.
*H04N 5/235* (2006.01)
*G03B 9/42* (2006.01)
*H04N 5/238* (2006.01)
*H04N 5/376* (2011.01)

(52) U.S. Cl.
CPC ............... *H04N 5/2353* (2013.01); *G03B 9/42* (2013.01); *H04N 5/238* (2013.01); *H04N 5/3765* (2013.01)

(58) Field of Classification Search
None
See application file for complete search history.

(56) References Cited

U.S. PATENT DOCUMENTS

| | | | | |
|---|---|---|---|---|
| 4,487,492 | A * | 12/1984 | Toyoda et al. | 396/466 |
| 2010/0027987 | A1 | 2/2010 | Tanaka | |
| 2010/0158504 | A1* | 6/2010 | Moriyama et al. | 396/479 |
| 2014/0016023 | A1* | 1/2014 | Min et al. | 348/362 |

FOREIGN PATENT DOCUMENTS

| | | |
|---|---|---|
| JP | 2010-34818 A1 | 2/2010 |
| JP | 2010-152000 A1 | 7/2010 |

* cited by examiner

*Primary Examiner* — Albert Cutler
(74) *Attorney, Agent, or Firm* — Kratz, Quintos & Hanson, LLP

(57) ABSTRACT

An image pickup device includes: an image pickup element; a control portion sequentially resetting charge stored in the image pickup element for every pixel line in a predetermined direction such that an electronic leading blade moves in a simulated manner; and a focal plane shutter.

6 Claims, 12 Drawing Sheets

IMAGE PICKUP DEVICE AND FOCAL PLANE SHUTTER

CROSS-REFERENCE TO RELATED APPLICATION

This application is based upon and claims priority to Japanese Patent Application No. 2013-055576 filed on Mar. 18, 2013, the subject matter of this patent document is incorporated by reference herein in its entirety.

BACKGROUND (i) Technical Field

The present invention relates to image pickup devices and focal plane shutters.

(ii) Related Art

For example, Japanese Patent Unexamined Application Publication No. 2010-34818 discloses an image pickup device with an electronic leading blade and mechanical trailing blades. After the electronic leading blade moves in the state where the trailing blades recede from an opening of a board, the trailing blades close the opening to perform exposure.

After an exposure operation is finished, image data are read from an image pickup element. During reading of the image data, the light has to be prevented from entering the image pickup element in consideration of an influence on the image data. Thus, the state where the opening is closed by the trailing blades has to be maintained for a predetermined period after the exposure operation.

In a case of using a normally open type shutter, the reading of the image date from the image pickup element is finished after the exposure operation, and then the trailing blades recede from the opening. This makes it possible to display a live view image on a liquid crystal display of a camera from the image pickup element in a real time manner, after the exposure operation.

Further, in continuous shooting, the reading of the image date from the image pickup element is finished after the exposure operation is finished, and then the trailing blades have to move away from the opening to perform a charging operation for a next exposure operation.

The trailing blades cannot be driven, until the image data are read from the image pickup element after the exposure operation. Thus, a shooting interval might not be shortened.

SUMMARY

It is therefore an object to provide an image pickup device and a focal plane shutter capable of shortening a shooting interval in using an electric leading blade.

According to an aspect of the present invention, there is provided an image pickup device including: an image pickup element; a control portion sequentially resetting charge stored in the image pickup element for every pixel line in a predetermined direction such that an electronic leading blade moves in a simulated manner; and a focal plane shutter including: a board including an opening for exposing the image pickup element; trailing blades being mechanical types and opening and closing the opening; a trailing-blade drive lever driving the trailing blades; an electromagnet capable of adsorbing and holding the trailing-blade drive lever; a biasing member biasing the trailing-blade drive lever to move away from the electromagnet; a set member moving the trailing-blade drive lever to abut the trailing-blade drive lever with the electromagnet such that the trailing blades move away from the opening; a shading member opening and closing the opening; and a shading-member drive lever driving the shading member in response to the set member, wherein the shading member moves toward the opening to maintain a closed state of the opening in cooperation with the trailing blades, when the trailing blades are moved away from the opening by the set member, and the control portion reads image data from the image pickup element in the closed state.

According to another aspect of the present invention, there is provided a focal plane shutter including: a board including an opening; trailing blades being mechanical types and opening and closing the opening; a trailing-blade drive lever driving the trailing blades; an electromagnet capable of adsorbing and holding the trailing-blade drive lever; a biasing member biasing the trailing-blade drive lever to move away from the electromagnet; a set member moving the trailing-blade drive lever to abut the trailing-blade drive lever with the electromagnet such that the trailing blades move away from the opening; a shading member opening and closing the opening; and a shading-member drive lever driving the shading member in response to the set member, wherein the shading member moves toward the opening to maintain a closed state of the opening in cooperation with the trailing blades, when the trailing blades are moved away from the opening by the set member.

DETAILED DESCRIPTION

Figure 1:
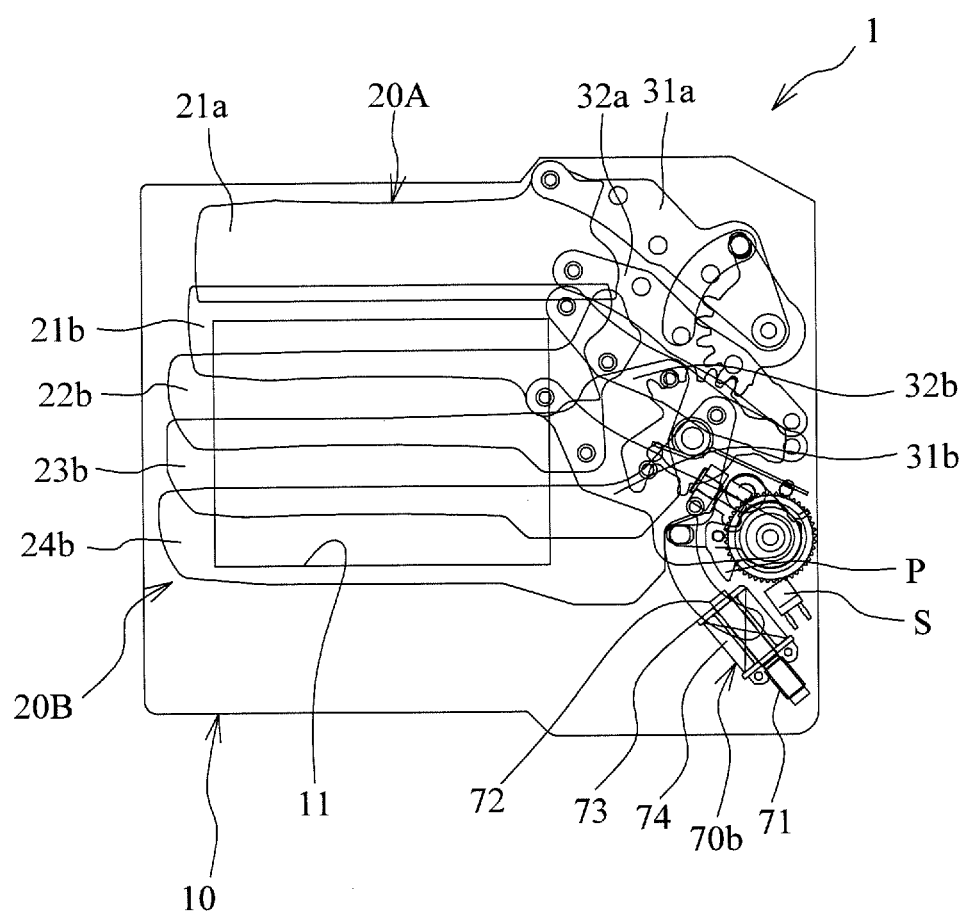
FIG. 1 is a front view of a focal plane shutter according to a present embodiment.
Figure 2:
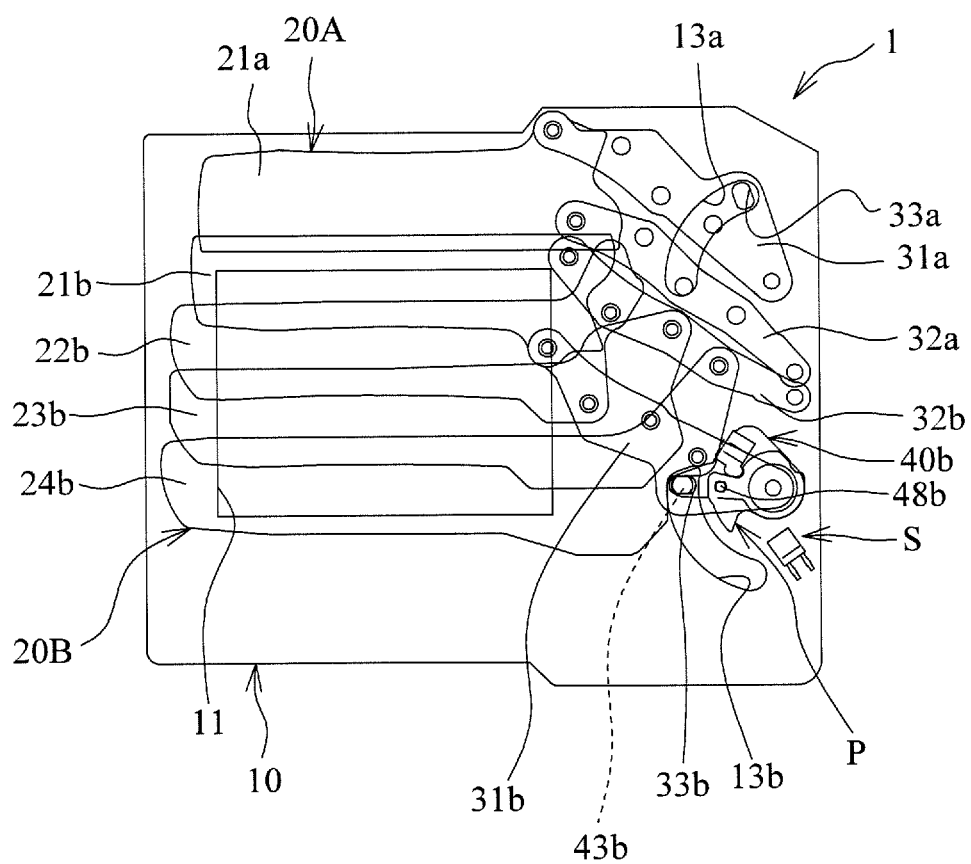
FIG. 2 is a front view of a part of the focal plane shutter.
Figure 3:
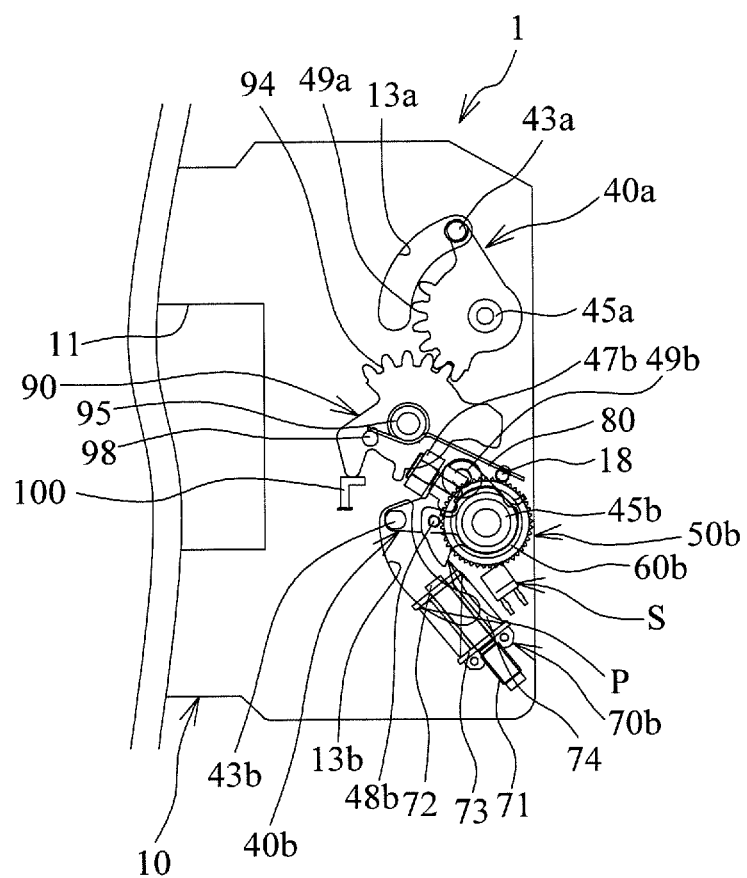
FIG. 3 is a front view of a part of the focal plane shutter.

In the following, the present embodiment according to the present invention will be described with reference to the drawings. FIG. 1 is a front view of a focal plane shutter 1 according to the present embodiment. FIGS. 2 and 3 are front views of a part of the focal plane shutter. Additionally, reference numerals are given to some of the parts in FIGS. 1 to 3.

As illustrated in FIG. 1, the focal plane shutter 1 includes a board 10, blades 21a, 21b to 24b, arms 31a, 32a, 31b, and 32b, and a self-holding type solenoid 70b. The board 10 is formed of a resin. The board 10 is provided with a rectangular opening 11.

Trailing blades 20B include four blades 21b to 24b. Also, a shading member 20A includes four blades. However, only one blade 21a is illustrated in FIGS. 1 and 2. FIGS. 1 to 3 illustrate the shading member 20A in an overlapped state and the trailing blades 20B in an expanded state. In FIGS. 1 to 3, the shading member 20A recedes from the opening 11 and the trailing blades 20B close the opening 11.

As illustrated in FIG. 2, the shading member 20A is connected to the arms 31a and 32a. The trailing blades 20B are connected to the arms 31b and 32b. Each of the arms 31a, 32a, 31b, and 32b is swingably supported by the board 10. The arms 31a and 31b are respectively provided with fitting holes 33a and 33b.

As illustrated in FIG. 3, the board 10 is provided with a shading-member drive lever 40a (hereinafter, referred to as drive lever) and a trailing-blade drive lever 40b (hereinafter, referred to as drive lever) that drive the arms 31a and 31b, respectively. The drive levers 40a and 40b are respectively provided with spindles 45a and 45b. The spindles 45a and 45b are rotatably supported by the board 10. Thus, each of the drive levers 40a and 40b is swingably supported in a given range by the board 10. The drive levers 40a and 40b are respectively provided with drive pins 43a and 43b. The board 10 is provided with escape holes 13a and 13b that escape the movements of the drive pins 43a and 43b, respectively. Each of the escape holes 13a and 13b has an arc shape. The drive pins 43a and 43b are respectively fitted into the fitting hole 33a of the arm 31a and the fitting hole 33b of the arm 31b. Swinging the drive lever 40a causes the arm 31a to swing and to move the shading member 20A. Likewise, swinging the drive lever 40b causes the arm 31b to swing and to move the trailing blades 20B.

The drive lever 40b holds a movable iron piece 47b. The drive lever 40b is swingable from a position where the movable iron piece 47b abuts the self-holding type solenoid 70b to a position where the movable iron piece 47b recedes from the self-holding type solenoid 70b. The spindle 45b is fitted with a bias spring 60b having a coil shape. The bias spring 60b biases the drive lever 40b in such a direction that the movable iron piece 47b moves away from the self-holding type solenoid 70b.

The spindle 45b engages a ratchet gear 50b. The ratchet gear 50b engages one end of the bias spring 60b. The other end of the bias spring 60b engages the drive lever 40b. The rotational degree of the ratchet gear 50b is adjusted, so that the biasing force of the bias spring 60b can be adjusted.

The self-holding type solenoid 70b is capable of adsorbing to the movable iron piece 47b by a given attraction force in a non-energized state, and reduces the attraction force in an energized state. The self-holding type solenoid 70b includes: a yoke 72; a coil bobbin 73 attached to the yoke 72; a coil 74 wounded around the coil bobbin 73; and a permanent magnet 71 secured to the yoke 72. Since the permanent magnet 71 is provided in the yoke 72, the yoke 72 also functions as a magnet. Therefore, the self-holding type solenoid 70b is capable of adsorbing to the movable iron piece 47b in the non-energized state.

Further, the coil 74 is energized to cancel a polarity generated in the yoke 72 by the permanent magnet 71, thereby reducing the magnetic attraction force effecting between the yoke 72 and the movable iron piece 47b. Thus, the coil 74 is energized to cancel the polarity generated in the yoke 72 by the permanent magnet 71 while the movable iron piece 47b is abutting the yoke 72 of the self-holding type solenoid 70b, thereby reducing the magnetic attraction force between the yoke 72 and the movable iron piece 47b. Therefore, the drive lever 40b is swung by the biasing force of the bias spring 60b. In such a way, the movable iron piece 47b moves away from the self-holding type solenoid 70b after being adsorbed thereto. The self-holding type solenoid 70b is an example of an electromagnet.

Additionally, a typical electromagnet may be used instead of the self-holding type solenoid 70b. The electromagnet includes: a yoke; a coil bobbin assembled into the yoke; and a coil wound around the coil bobbin. The energization of the coil excites the yoke, and then the magnetic attraction force is generated between the yoke and the movable iron piece 47b. This maintains the drive lever 40b at a predetermined position. The energization of the electromagnet is stopped to swing the drive lever 40b in accordance with the biasing force of the bias spring 60b.

A set member 90 is provided for positioning the drive lever 40b at desirable positions. The set member 90 has a spindle 95 rotatably supported by the board 10. The set member 90 is attached with a return spring 80 for returning the set member 90 to an initial position. The return spring 80 is fitted onto the spindle 95. One end of the return spring 80 abuts a projection portion 18 formed in the board 10. The other end of the return spring 80 abuts a projection portion 98 formed in the set member 90. The return spring 80 biases the set member 90 counterclockwise.

A gear portion 94 is partly formed at an outer circumferential portion of the set member 90. Also, a gear portion 49a is partly formed at an outer circumferential portion of the drive lever 40a. The gear portion 94 of the set member 90 and the gear portion 49a of the drive lever 40a mesh each other, thereby interlocking the drive lever 40a with the set member 90. That is, the set member 90 and the drive lever 40a always drive together.

A thin plate P is arranged coaxially with the drive lever 40b. The thin plate P has a thin plate shape. An engagement pin 48b is formed in the drive lever 40b and fitted into the thin plate P. Therefore, the thin plate P and the drive lever 40b swing together. Further, a sensor S is arranged near the drive lever 40b. The sensor S is a sensor capable of detecting a position of the thin plate P. The sensor S detects the position of the thin plate P to detect a position of the trailing blades 20B.

Figure 4A:
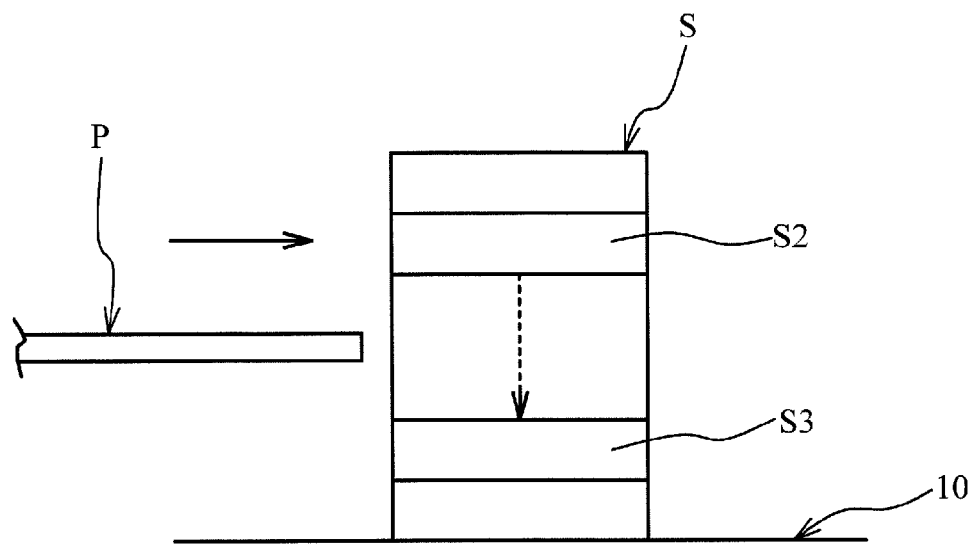
FIGS. 4A and 4B are explanatory views of a sensor.
Figure 4B:
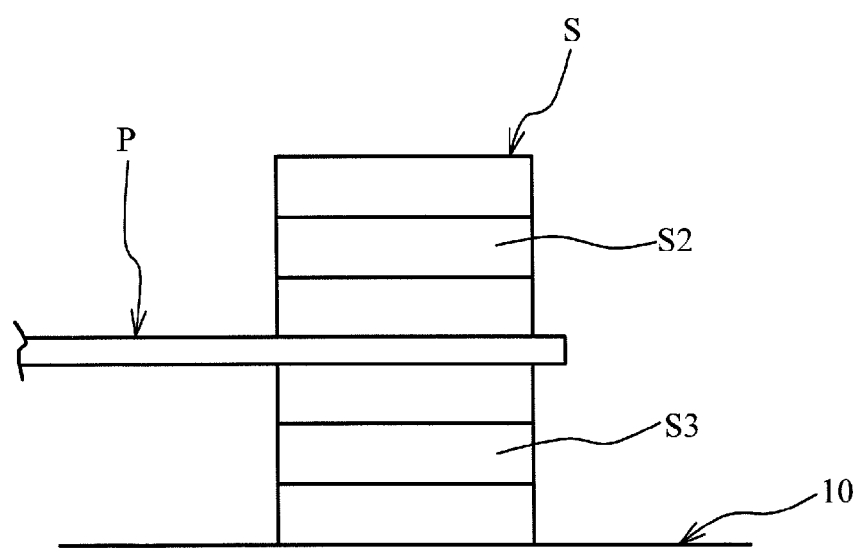

FIGS. 4A and 4B are explanatory views of the sensor S. The sensor S is arranged on the board 10. The sensor S has a light emitting element S2 and a light receiving element S3 that are arranged to face each other. The light receiving element S3 receives the light emitted from the light emitting element S2. As illustrated in FIGS. 4A and 4B, the thin plate P moves to be positioned between the light emitting element S2 and the light receiving element S3 in response to the swinging of the drive lever 40b. When being positioned between the light emitting element S2 and the light receiving element S3, the thin plate P interrupts the light emitted from the light emitting element S2. At this time, whether or not the thin plate P is positioned between the light emitting element S2 and the light receiving element S3 can be detected based on output signals from the light receiving element S3, thereby detecting the position of the drive lever 40b. This can result in detecting the position of the trailing blades 20B.

Additionally, the sensor S is not limited to the above configuration. For example, the sensor S may include: a light emitting element; a mirror reflecting the light emitted from the light emitting element; and a light receiving element receiving the light reflected by the mirror. The thin plate P is positioned between the light emitting element and the mirror, or between the light receiving element and the mirror, thereby detecting the position of the thin plate P.

Figure 5:
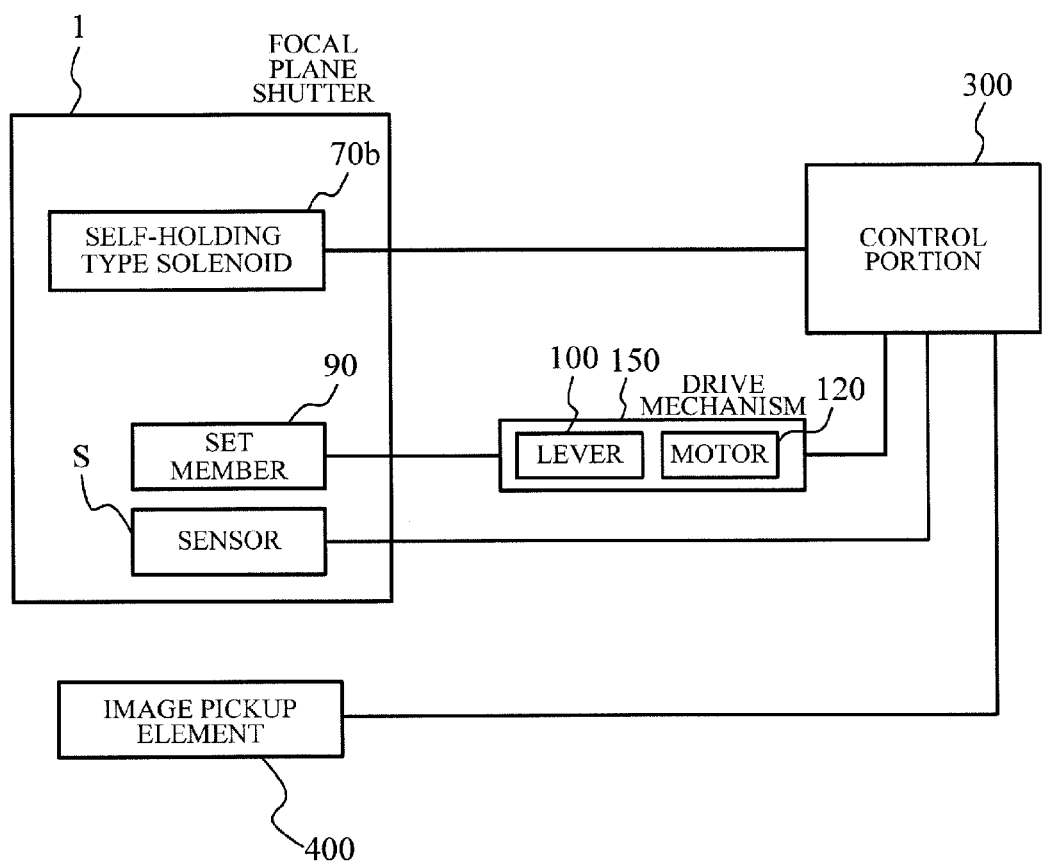
FIG. 5 is a block diagram of a camera equipped with the focal plane shutter.

A description will be given of a configuration of a camera equipped with the focal plane shutter 1. FIG. 5 is a block diagram of the camera equipped with the focal plane shutter 1. The camera includes: the focal plane shutter 1; a drive mechanism 150; a control portion 300; and an image pickup element 400. The control portion 300 controls an operation of the whole camera and includes a CPU, a ROM, and a RAM. Additionally, the camera includes lenses, not illustrated, for adjusting a focal length.

The control portion 300 controls an energization state of the coil 74 of the self-holding type solenoid 70b. The image pickup element 400 changes an object image into electric signals to generate image data. The control portion 300 reads and stores the generated image data in the image pickup element 400. The image pickup element 400 is, for example, a CCD or a CMOS. The drive mechanism 150 drives the set member 90 in response to the instruction from the control portion 300. The control portion 300 controls the energization of the coil 74 of the self-holding type solenoid 70b based on output signals from the sensor S, as will be described later.

The drive mechanism 150 includes: a lever 100 driving the set member 90; and a motor 120 capable of linearly reciprocating the lever 100 by a known technique, and rotatable in forward and reverse directions. The motor 120 is a stepping motor, and drives the lever 100 via gears not illustrated. The control portion 300 controls the driving of the motor 120 to control the lever 100. This controls the rotation of the set member 90. The control portion 300 controls the rotational speed of the motor 120 to control the driving speed of the lever 100. This controls the rotational speed of the set member 90.

The control portion 300 corresponding to an example of a control portion sequentially resetting charge stored in the image pickup element 400 for every pixel line in a predetermined direction such that an electronic leading blade moves in a simulated manner. Specifically, the charge stored in the image pickup element 400 is reset for every pixel line in the direction perpendicular to the direction in which the trailing blades 20B move. Therefore, the electronic leading blade artificially moves from an exposure start position to an exposure end position. Also, the image pickup element 400 is exposed from the opening 11, when the shading member 20A and the trailing blades 20B recede from the opening 11.

Additionally, a mode is changed into a single shooting mode or a continuous shooting mode, as depending on the operation to the release button of the camera. The mode is changed to the continuous shooting mode by long pushing the release button, and the camera shoots continuously while the release button is pushed. The mode is changed to the single shooting mode by short pushing the release button, and the camera shoots an image whenever the release button is pushed.

Figure 6:
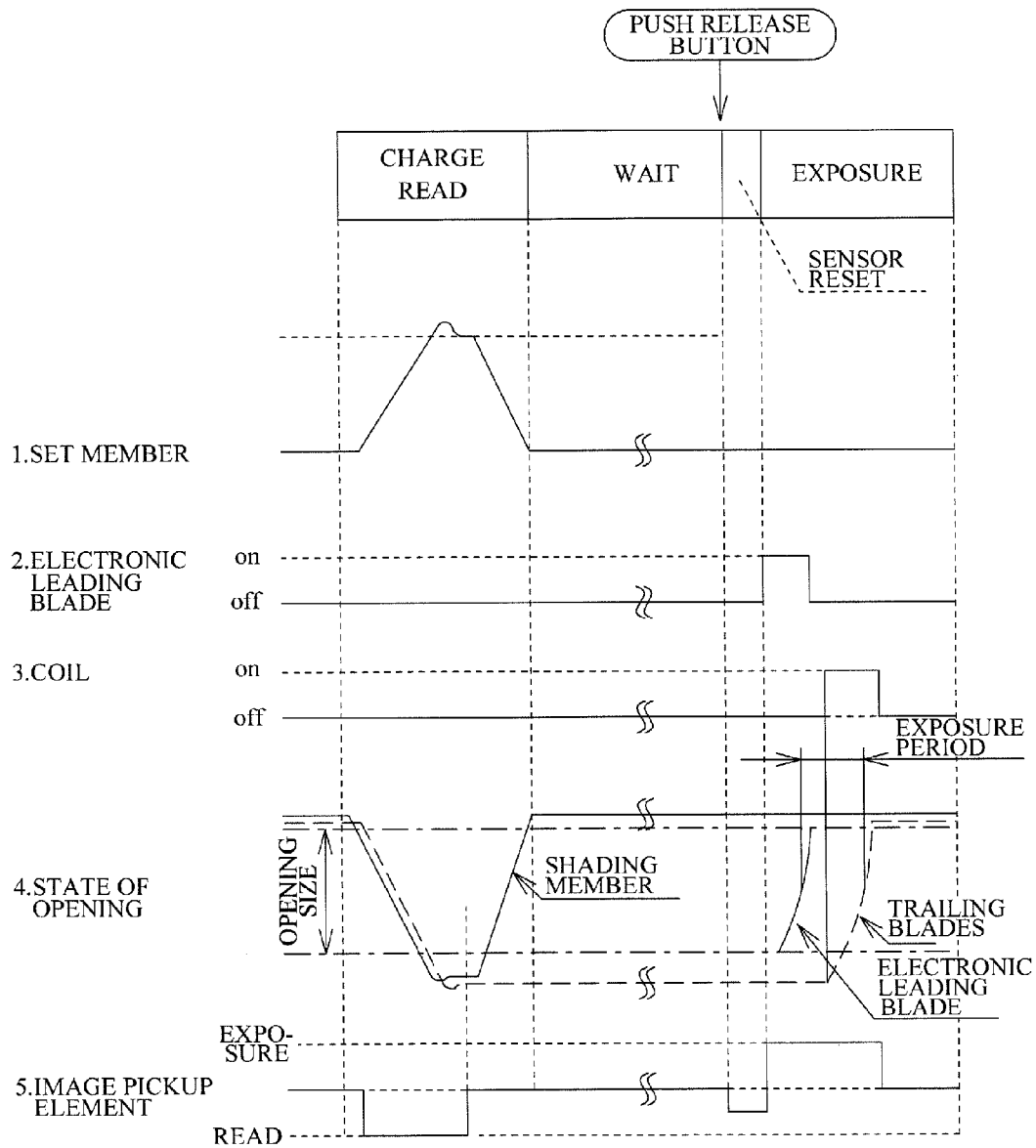
FIG. 6 is a timing chart of the focal plane shutter.

Next, an operation of the focal plane shutter 1 will be described. FIG. 6 is a timing chart of the focal plane shutter 1. FIGS. 7 to 11 are explanatory views of the operation of the focal plane shutter 1. Additionally, some parts are omitted in FIGS. 7 to 11. Additionally, some reference numerals are omitted in FIGS. 7 to 11. FIGS. 1 to 3 illustrate a state just after an exposure operation is finished.

After the exposure operation illustrated in FIGS. 1 to 3 is finished, a charging operation is started. Specifically, the set member 90 is rotated clockwise against the biasing force of the return spring 80 by driving the lever 100 illustrated in FIG. 3. Since the gear portion 94 of the set member 90 meshes the gear portion 49a of the drive lever 40a, the drive lever 40a swings counterclockwise. Also, the set member 90 abuts a roller 49b provided in the drive lever 40b and causes the drive lever 40b to swing counterclockwise. Therefore, the shading member 20A expands and moves to close the opening 11. The trailing blades 20B move away from the opening 11. Therefore, the trailing blades 20B are positioned at a movement start position. Here, during the charging operation, the shading member 20A and the trailing blades 20B move to maintain a closed state of the opening 11. In particular, the shading member 20A moves toward the opening 11 to follow the trailing blades 20B moving away from the opening 11. Thus, while the trailing blades 20B is moving away from the opening 11, the shading member 20A moves toward the opening 11 to maintain the closed state of the opening 11. It will be described later in detail. Additionally, when the drive lever 40b swings counterclockwise, the thin plate P also swings counterclockwise.

Figure 7:
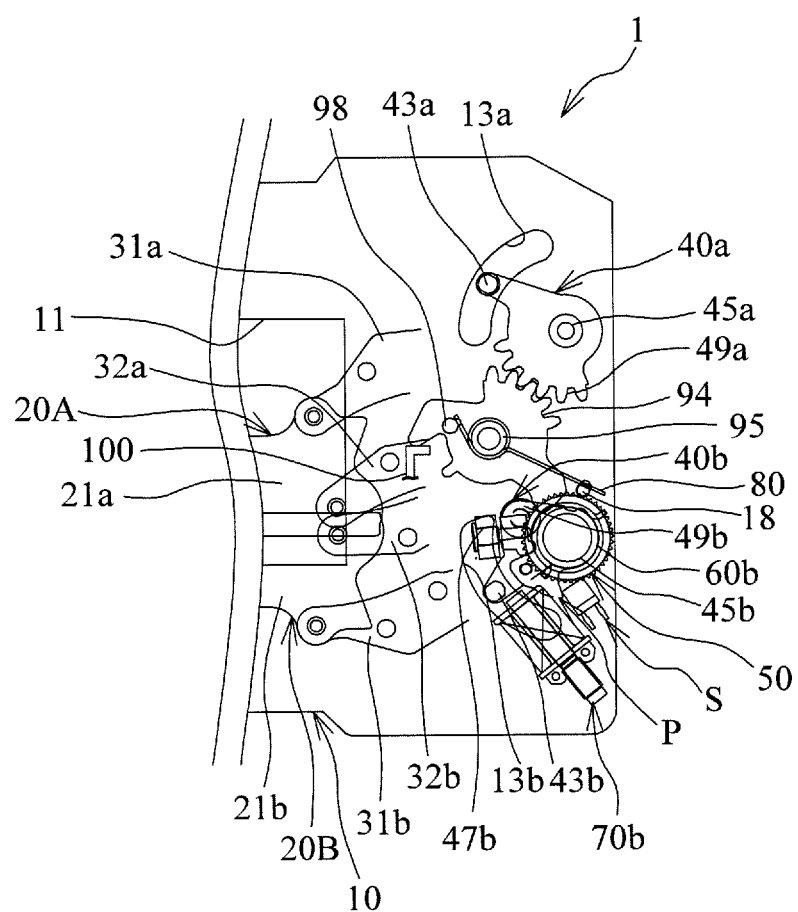
FIG. 7 is an explanatory view of an operation of the focal plane shutter.

The swinging of the thin plate P counterclockwise allows the sensor S to detect the thin plate P. FIG. 7 illustrates the focal plane shutter 1 in a state where the sensor S starts detecting the thin plate P. Before the trailing blades 20B fully recede from the opening 11 and before the movable iron piece 47b abuts the self-holding type solenoid 70b, the sensor S detects the thin plate P.

Figure 8:
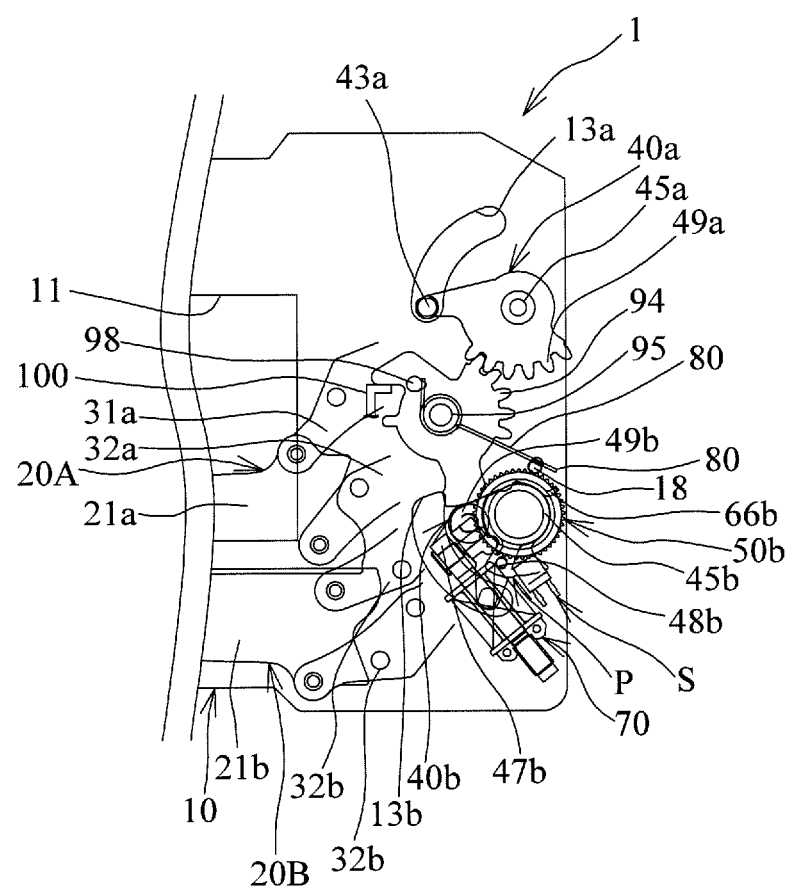
FIG. 8 is an explanatory view of the operation of the focal plane shutter.

Further, when the set member 90 rotates clockwise, the drive levers 40a and 40b further swing counterclockwise. As illustrated in FIG. 8, the shading member 20A closes the opening 11, and the trailing blades 20B recede from the opening 11. In this state, the movable iron piece 47b abuts the self-holding type solenoid 70b.

Figure 9:
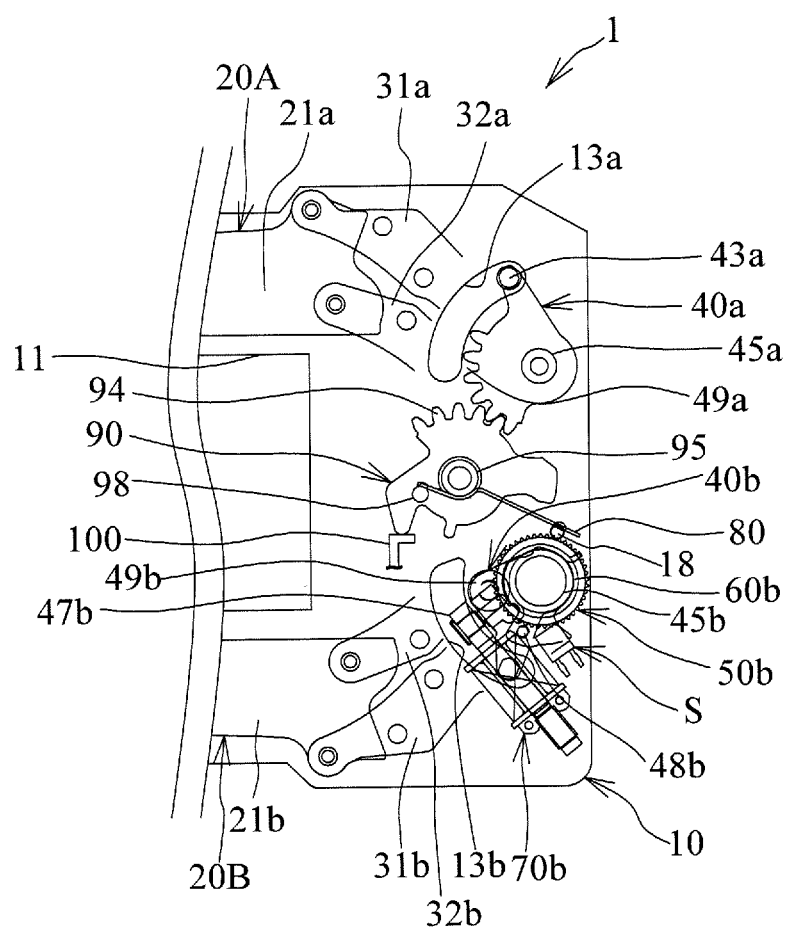
FIG. 9 is an explanatory view of the operation of the focal plane shutter.

After that, the control portion 300 causes the lever 100 to move away from the set member 90. Therefore, the set member 90 swings counterclockwise in accordance with the biasing force of the return spring 80. Since the drive lever 40a meshes the set member 90, the drive lever 40a swings clockwise and the shading member 20A moves away from the opening 11. Further, the movable iron piece 47b of the drive lever 40b is maintained in the state of being adsorbed to and held by the yoke 72 of the self-holding type solenoid 70b. Thus, the trailing blades 20B also is maintained in the state of receding from the opening 11. Thus, as illustrated in FIG. 9, the shading member 20A and the trailing blades 20B recede from the opening 11, so the opening 11 is brought into the opened state. The focal plane shutter 1 is brought into a wait state illustrated in the timing chart of FIG. 6. In addition, in the wait state, the self-holding type solenoid 70b is not energized. Further, since the shading member 20A and the trailing blades 20B recede from the opening 11 in the wait state, it is possible to perform the live view display in which output from the image pickup element 400 is displayed on a liquid crystal monitor of the camera in a real time manner.

Figure 10:
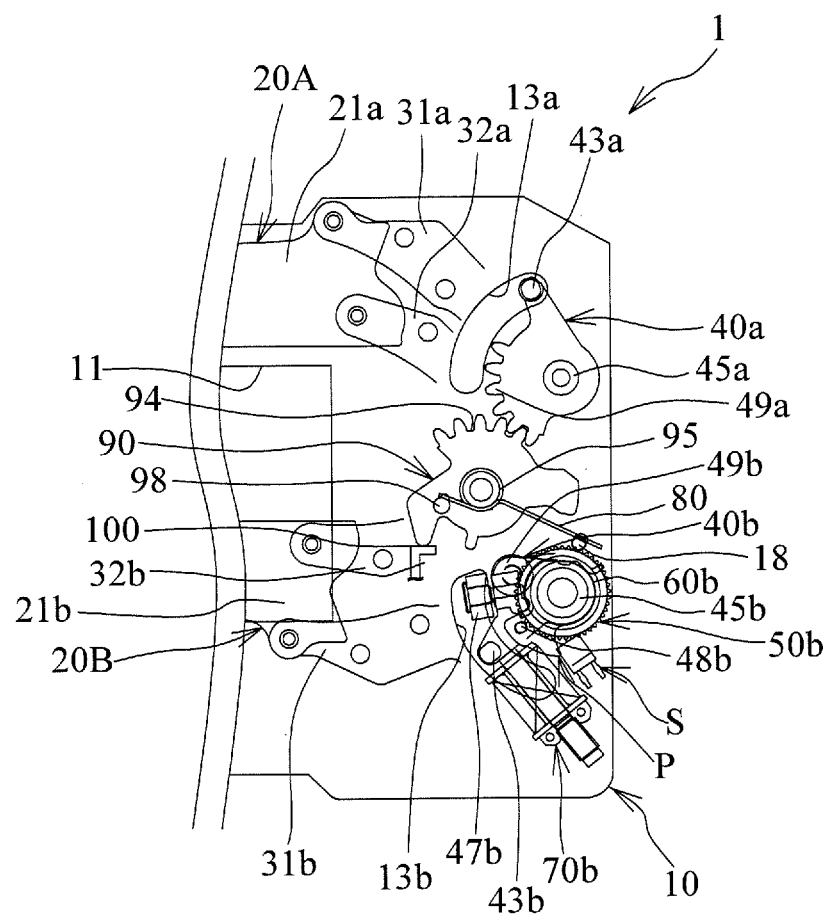
FIG. 10 is an explanatory view of the operation of the focal plane shutter.
Figure 11:
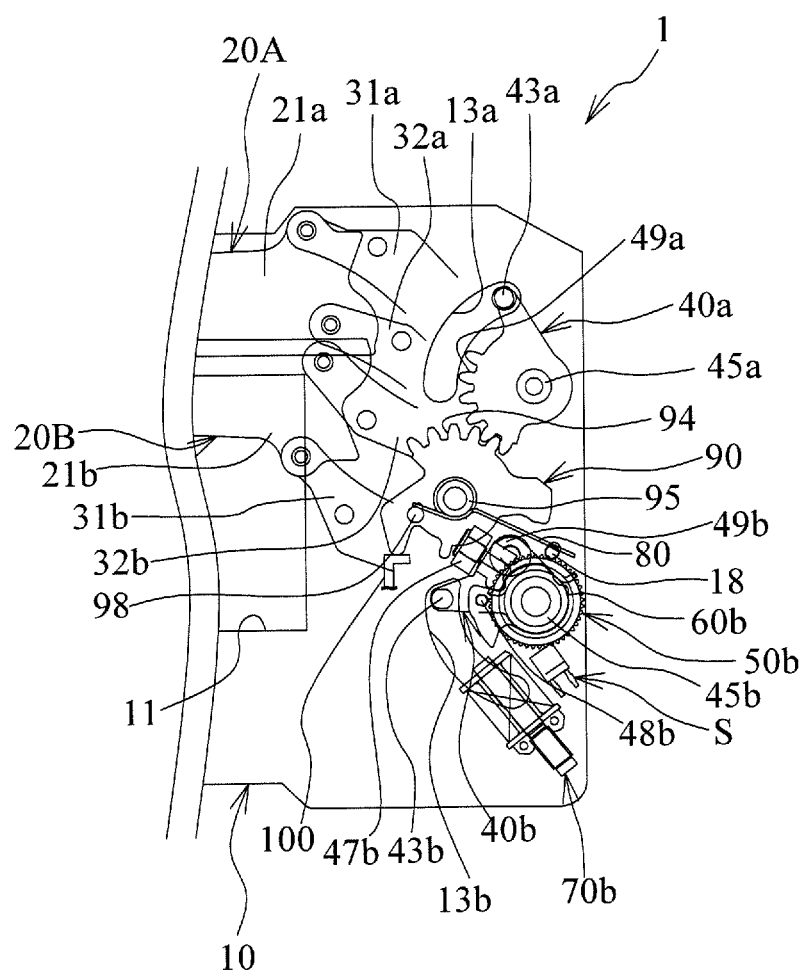
FIG. 11 is an explanatory view of the operation of the focal plane shutter.

Subsequently, in shooting, a release button of the camera is pushed, the control portion 300 performs a sensor reset to erase the charges stored in the image pickup element 400. Next, the control portion 300 controls the image pickup element 400 to move the electronic leading blade from the exposure start position to the exposure end position in a simulated manner. After a predetermined period lapses since the electronic leading blade starts moving, the control portion 300 energizes the coil 74 of the self-holding type solenoid 70b. This reduces the magnetic attraction force effecting between the self-holding type solenoid 70b and the movable iron piece 47b, and then the drive lever 40b is rotated clockwise by the biasing force of the bias spring 60b. Thus, the trailing blades 20B move to close the opening 11 as illustrated in FIG. 10. FIG. 11 illustrates the state just after the exposure operation is finished. The state illustrated in FIG. 11 is the same as the states illustrated in FIGS. 1 to 3. In such a way, one cycle of shooting is finished. The energization of the coil 74 of the self-holding type solenoid 70b is stopped after a given period lapses since the energization starts. Additionally, the drive lever 40b swings counterclockwise, and then the thin plate P recedes from the sensor S to change its output value. The fully opened state of the opening 11 as illustrated in FIG. 9 is formed not only in photo shooting but also in movie shooting.

After the exposure operation is finished, the charging operation is performed by maintaining the state, illustrated in FIGS. 7 and 8, in which the trailing blades 20B recede from the opening 11, again. Also, the shading member 20A moves away from the opening 11 in the state where the trailing blades 20B recede from the opening 11.

In the continuous shooting mode, after a predetermined period lapses since the charging operation is finished, the sensor reset is performed to erase the charges stored in the image pickup element 400, and the exposure is performed again. A waiting period in the continuous shooting mode is set longer than a period needed for stopping of the bound of the shading member 20A at the time when the shading member 20A moves away from the opening 11 and stops. In the single shooting mode, the real-time images are displayed on the liquid crystal monitor of the camera in a wait state after the charging operation.

Here, in the charging operation, while the trailing blades 20B are moving away from the opening 11, the shading member 20A moves toward the opening 11 to maintain the closed state of the opening 11 in cooperation with the trailing blades 20B, as mentioned above. While the shading member 20A and the trailing blades 20B cooperatively close the opening 11 in the charging operation, the control portion 300 reads the image data from the image pickup element 400. In such a way, the image data of the image pickup element 400 are read in the charging operation in the present embodiment.

Thus, a period needed for shooting an image can be shortened, as compared with a case where the charging operation is performed after the reading of the image date from the image pickup element 400 is finished. Therefore, high-speed continuous shooting can be achieved in the continuous shooting mode. Also, a period needed for shooting an image can be shortened even in the single shooting mode, thereby shortening a shooting interval.

Additionally, the image data are read from the image pickup element 400 in the closed state of the opening 11 in the embodiment, so the smear or the like can be prevented. Also, the reading of the image data may start, before the trailing blades 20B start moving away from the opening 11 after the exposure operation is finished. The reading of the image data has only to be finished in the state where the trailing blades 20B close the opening 11 and before the shading member 20A starts moving away from the opening 11.

The focal plane shutter 1 is not provided with an electromagnet for holding the drive lever 40a at a predetermined position. Thus, as for the focal plane shutter 1, the number of the parts is reduced, so reduced size, reduced weight, and reduced cost are achieved. Also, there is no electromagnet for holding the drive lever 40a at a predetermined position, thereby suppressing the power consumption.

The self-holding type solenoid 70b is a solenoid of a self holding type capable of adsorbing and holding the drive lever 40b in the non-energization state. Thus, as illustrated in FIG. 6, the coil 74 of the self-holding type solenoid 70b is energized only when the drive lever 40b moves away from the self-holding type solenoid 70b. Thus, the energization period of the self-holding type solenoid 70b is so short to suppress the power consumption in the present embodiment, as compared with an electromagnet for adsorbing and holding the drive lever 40b by the enegization.

Additionally, in the state where the shading member 20A recedes from the opening 11 as illustrated in FIG. 9, the set member 90 is restricted from swinging clockwise by the return spring 80. That is, in the state illustrated in FIG. 9, when the clockwise force is exerted on the set member 90 for some reason, the biasing force of the return spring 80 acts to return the set member 90 back to the initial position. Here, the drive lever 40a meshes the set member 90, so the biasing force of the return spring 80 acts to return the drive lever 40a to the initial position. For this reason, for example, when the shock is applied to the focal plane shutter 1, the positional displacement of the drive lever 40a is prevented. Thus, it is prevented that the shading member 20A is positionally displaced and is moved toward the opening 11 by the shock or the like.

Also, the drive lever 40a always meshes the set member 90, and the set member 90 is biased by the return spring 80. This provides the drive lever 40a side with no biasing member for biasing the drive lever 40a in one direction. Thus, the number of the parts is reduced.

The shading member 20A does not drive at the time of the exposure operation. The exposure operation is performed by the electronic leading blade and the mechanical trailing blades 20B. Thus, unlike mechanical leading blades, the movement property of the shading member 20A, for example, such as a movement start timing, does not have to be strictly set.

The above embodiment has been described an example in which the set member 90 interlocks with the drive lever 40a by meshing the gear portion 94 of the set member 90 with the gear portion 49a of the drive lever 40a. However, the present invention is not limited to this. For example, the set member may interlock with the drive lever by a lever or the like.

Also, in the above embodiment, the set member 90 directly engages the drive lever 40a. However, the present invention is not limited to this. For example, the set member may interlock with the drive lever through another member such as a gear.

Figure 12:
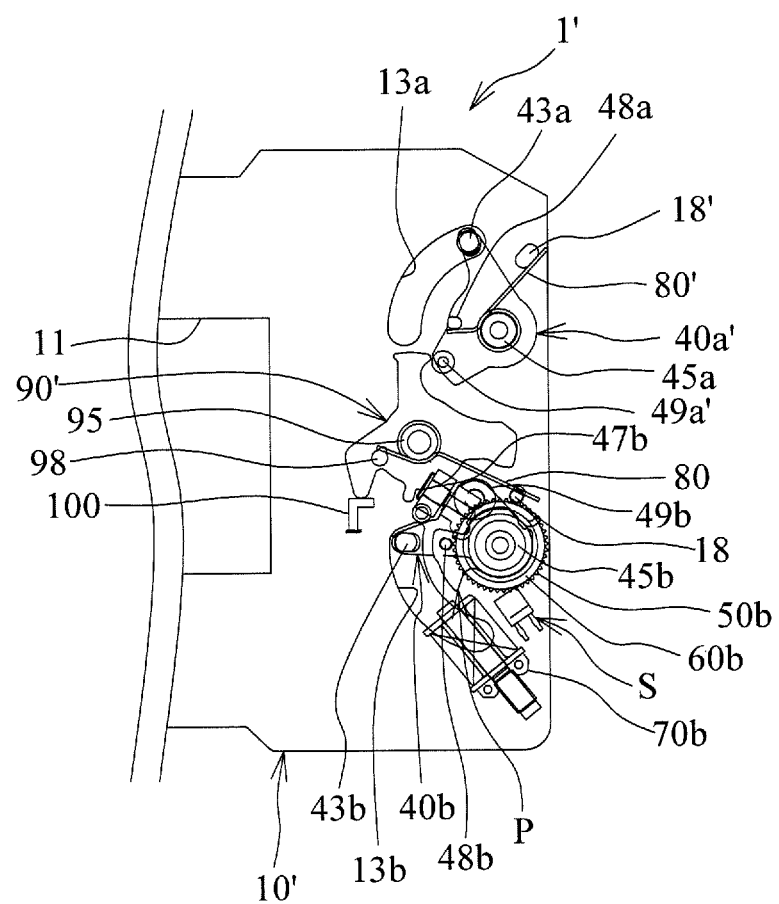
FIG. 12 is an explanatory view of a variation of a focal plane shutter.

FIG. 12 is an explanatory view of a variation of a focal plane shutter 1'. Additionally, the same components have the same reference numerals in order to avoid a duplicated explanation. Also, the configuration is partly omitted in FIG. 12. There is no gear portion provided in a set member 90' or a drive lever 40a'. A return spring 80' is wound around a spindle 45a of the drive lever 40a'. One end of the return spring 80' abuts a projection portion 18' formed on a board 10'. The other end of the return spring 80' abuts a projection portion 48a formed on the drive lever 40a'. The return spring 80' biases the drive lever 40a' clockwise. Also, a roller 49a' is provided in the drive lever 40a'.

When the set member 90' swings clockwise in the state where the shading member 20A recedes from the opening 11, the set member 90' pushes the roller 49a' of the drive lever 40a' to swing the drive lever 40a' counterclockwise against the biasing force of the return spring 80'. Therefore, the shading member 20A moves toward the opening 11. Also, when the set member 90' swings counterclockwise in the state where the shading member 20A closes the opening 11, the roller 49a' pushes the set member 90' in accordance with the biasing force of the return spring 80', so that the drive lever 40a' swings clockwise to follow the set member 90'. Therefore, the shading member 20A moves away from the opening 11. In such a way, the drive lever 40a' interlocks with the set member 90'. A shooting interval can also be shortened in using the electronic leading blade by such a focal plane shutter 1'.

The drive lever 40a' is biased clockwise by the return spring 80'. This can prevent the shading member 20A from being positionally displaced and being moved toward the opening 11 due to the shock or the like.

The set member 90' and the drive lever 40a' do not always have to abut each other. For example, the set member 90' may be spaced from the drive lever 40a' in the state where the shading member 20A recedes from the opening 11. The set member 90' may abut and swing the drive lever 40a', only when the set member 90' swings the drive lever 40b.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical apparatus such as a still camera or a digital camera.

Although the blade made of a synthetic resin has been described in the present embodiment, the blade having the thin shape may be made of a metal.

In the above embodiment, the shading member and the trailing blades are each composed of four blades. However, the shading member and the trailing blades are not limited to these arrangements. The shading member and the trailing blades may be each composed of two to five blades and may be different in number.

The sensor S detects the position of the drive lever 40b in response to the thin plate P interrupting the light emitted from the light emitting element S2 toward the light receiving element S3. However, the sensor S is not limited to this configuration. For example, a sensor may be provided at a position such that the blade 21b interrupts the light emitted from the light emitting element S2 toward the light receiving element S3 in accordance with the traveling of the trailing blades 20B.

What is claimed is:

1. An image pickup device, comprising:
   an image pickup element;
   a control portion sequentially resetting charge stored in the image pickup element for every pixel line in a predetermined direction such that an electronic leading blade moves in a simulated manner; and
   a focal plane shutter including:
      a board including an opening for exposing the image pickup element;
      trailing blades being mechanical types and opening and closing the opening;
      a trailing-blade drive lever driving the trailing blades;
      an electromagnet capable of adsorbing and holding the trailing-blade drive lever;
      a spring biasing the trailing-blade drive lever to move away from the electromagnet;
      a set member moving the trailing-blade drive lever to abut the trailing-blade drive lever with the electromagnet such that the trailing blades move away from the opening, wherein the set member includes a spindle rotatably supported by the board, and wherein the set member rotates to move the trailing-blade drive lever;
      a shading member opening and closing the opening, wherein the shading member includes a plurality of blades; and
      a shading-member drive lever driving the shading member in response to the set member,
   wherein the set member and the shading-member drive lever are always interlocked with each other,
   wherein the shading member moves toward the opening to maintain a closed state of the opening in cooperation with the trailing blades, when the trailing blades are moved away from the opening by the set member, and
   wherein the control portion reads image data from the image pickup element in the closed state.

2. The image pickup device of claim 1, wherein the set member and the shading-member drive lever have gear portions meshing with each other.

3. The image pickup device of claim 1, wherein the shading-member drive lever is biased to engage the set member.

4. The image pickup device of claim 1, wherein the focal plane shutter is not provided with an electromagnet for holding the shading-member drive lever at a predetermined position.

5. The image pickup device of claim 1, wherein the electromagnet is a self-holding type solenoid capable of adsorbing and holding the trailing blade-drive lever in a non-energized state.

6. A focal plane shutter, comprising:
   a board including an opening;
   trailing blades being mechanical types and opening and closing the opening;
   a trailing-blade drive lever driving the trailing blades;
   an electromagnet capable of adsorbing and holding the trailing-blade drive lever;
   a spring biasing the trailing-blade drive lever to move away from the electromagnet;
   a set member moving the trailing-blade drive lever to abut the trailing-blade drive lever with the electromagnet such that the trailing blades move away from the opening, wherein the set member includes a spindle rotatably supported by the board, and wherein the set member rotates to move the trailing-blade driver lever;
   a shading member opening and closing the opening, wherein the shading member includes a plurality of blades; and
   a shading-member drive lever driving the shading member in response to the set member,
   wherein the set member and the shading-member drive lever are always interlocked with each other, and
   wherein the shading member moves toward the opening to maintain a closed state of the opening in cooperation with the trailing blades, when the trailing blades are moved away from the opening by the set member.

* * * * *